United States Patent
Aizawa

(10) Patent No.: US 6,896,931 B2
(45) Date of Patent: May 24, 2005

(54) METHODS OF FORMING POLYBENZIMIDAZOLE COATING FILM AND OF FORMING FILM

(75) Inventor: Masami Aizawa, Tokyo (JP)

(73) Assignee: Clariant Finance (BVI) Limited, Tortola (VG)

( * ) Notice: Subject to any disclaimer, the term of this patent is extended or adjusted under 35 U.S.C. 154(b) by 24 days.

(21) Appl. No.: 10/432,556

(22) PCT Filed: Sep. 30, 2002

(86) PCT No.: PCT/JP02/10195

§ 371 (c)(1),
(2), (4) Date: May 22, 2003

(87) PCT Pub. No.: WO03/029374

PCT Pub. Date: Apr. 10, 2003

(65) Prior Publication Data

US 2004/0028824 A1 Feb. 12, 2004

(30) Foreign Application Priority Data

Sep. 28, 2001 (JP) .................... 2001-303323

(51) Int. Cl.⁷ ................................ B05D 3/02
(52) U.S. Cl. .................................. 427/385.5
(58) Field of Search ........................ 427/385.5

(56) References Cited

U.S. PATENT DOCUMENTS 3,493,541 A  *  2/1970  Gall ........................ 528/245
3,763,107 A  * 10/1973  D'Alelio ..................... 528/38

FOREIGN PATENT DOCUMENTS

| EP | 95348 | * | 11/1983 |
| EP | 816415 | * | 1/1998 |
| JP | 10-087989 | * | 4/1998 |

OTHER PUBLICATIONS

Neuse, Chemistry and Industry (London, United Kingdon), 5, pp 315–316, 1975.*

Search report of PCT/JP02/10195, Aug. 2003.*

Neuse, Chemistry and Industry (London, United Kingdom), 7, pp 315–316, 1975.*

* cited by examiner

Primary Examiner—Erma Cameron
(74) Attorney, Agent, or Firm—Alan P. Kass

(57) ABSTRACT

There are provided a method for forming a polybenzimidazole coating on a surface of a substrate, and a method for forming a polybenzimidazole film. The method for forming a polybenzimidazole coating comprises the steps of: coating a solution containing a polybenzimidazole prepolymer onto a surface of a substrate; and heating the coated substrate to cyclize the prepolymer and thus to form a cured coating on the surface of the substrate. The method for forming a polybenzimidazole film comprises separating the cured coating, formed by the above method, from the substrate.

9 Claims, No Drawings

METHODS OF FORMING POLYBENZIMIDAZOLE COATING FILM AND OF FORMING FILM

FIELD OF THE INVENTION

The present invention relates to a method for forming a polybenzimidazole coating. More particularly, the present invention relates to a method for forming a polybenzimidazole coating, wherein a polybenzimidazole prepolymer solution is coated onto a substrate and the prepolymer is cyclized in the coated solution to form a polybenzimidazole coating which covers the substrate.

BACKGROUND ART

Polybenzimidazoles possess excellent energy resistance and chemical resistance. However, because of the excellent chemical resistance among these properties, for example, excellent solvent resistance, the solubility of polybenzimidazoles in solvents is so low that only solutions having a relatively low polybenzimidazole concentration can be prepared. Further, due to this property, enhancing the viscosity of the solution by increasing the polybenzimidazole concentration is difficult. Therefore, for example, when the polybenzimidazole solution is coated onto a substrate to form a coating, a thick coating cannot be formed without difficulties.

On the other hand, by virtue of their properties, polybenzimidazoles are expected to be utilized in semiconductor production devices and the like. Specifically, the covering of the production device on its surface formed of a metal or the like with a polybenzimidazole coating can protect the production device and, at the same time, can prevent the semiconductor device, to be produced, from being brought into contact with a metal, whereby the contamination of the semiconductor device with impurities can be prevented. As described above, however, difficulties are encountered in forming a satisfactorily thick coating by coating of the polybenzimidazole solution. In order to solve the above problem, the incorporation of a metal solubilizer has also been studied. However, this method also cannot significantly improve the solubility of polybenzimidazoles and, in addition, is disadvantageously causative of the inclusion of metallic impurities.

SUMMARY OF THE INVENTION

<Subject Matter>

The method for forming a cured coating on a surface of a substrate according to the present invention is characterized by comprising the steps of: coating a solution containing a polybenzimidazole prepolymer onto a surface of a substrate; and heating the coating to cyclize the prepolymer.

<Effect>

In the method for coating formation according to the present invention, the use of a concentrated prepolymer solution can realize the formation of a polybenzimidazole coating having a large thickness, which has hitherto been unattainable, on a substrate and can impart heat resistance, chemical resistance and other properties to the surface of the substrate.

DETAILED DESCRIPTION OF THE INVENTION

Prepolymer

In the method according to the present invention, a polybenzimidazole prepolymer is one which can be cyclized optionally upon heating or the like to form a polybenzimidazole resin. The molecular weight and the like of the prepolymer are not particularly limited, but are selected so that the prepolymer is highly soluble in a solvent used and can be satisfactorily cured upon cyclization.

Here polybenzimidazole refers to a polymer comprising substituted or unsubstituted benzimidazole as monomer units. When the benzimidazole has a substituent, the substituent may be any one so far as the substituent does not sacrifice the effect of the present invention.

Preferred polybenzimidazole are represented by formula (I):

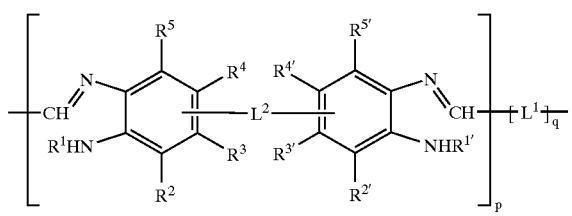

(I)

wherein
$R^1$ to $R^5$ and $R^{1'}$ to $R^{5'}$ each independently are a substituent;
$L^1$ is a divalent linking group;
$L^2$ is a divalent linking group which bonds any one of $R^1$ to $R^5$ to any one of $R^{1'}$ to $R^{5'}$; and
p and q each are a number which indicates the degree of polymerization.

Here $R^1$ to $R^5$ and $R^{1'}$ to $R^{5'}$ each independently are preferably hydrogen, an alkyl group having 1 to 10 carbon atoms, an aryl group having 6 to 12 carbon atoms, a halogen, a hydroxyl group, or an alkoxyl group having 1 to 10 carbon atoms.

$L^1$ and $L^2$ each independently are preferably a single bond or a divalent linking group comprised of a chalcogen atom, an aromatic compound, an aliphatic compound, an alicyclic compound, or a heterocyclic compound.

When $L^1$ or $L^2$ is a linking group comprised of an aliphatic compound, an alkylene having 1 to 8 carbon atoms is preferred; when $L^1$ or $L^2$ is a linking group comprised of an aromatic compound, phenylene or naphthylene is preferred; when $L^1$ or $L^2$ is a linking group comprised of a heterocyclic compound, pyridinylene, pyrazinylene, furanylene, quinolinylene, thiophenylene, pyranylene, indenylene, or furylenylene is preferred; and when $L^1$ or $L^2$ is a linking group comprised of chalcogen, —O—, —S—, or —$SO_2$— is preferred.

Preferred prepolymers among the prepolymers represented by formula (I) are represented by formula (Ia)

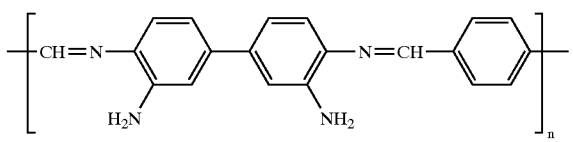

(Ia)

wherein n is a number which represents the degree of polymerization.

Polybenzimidazoles produced by condensing prepolymers represented by formula (I) are represented by formula (II), and particularly polybenzimidazoles produced by condensing prepolymers represented by formula (Ia) are represented by formula (IIa)

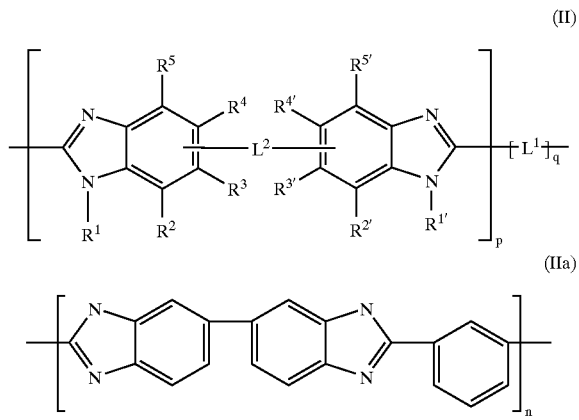

(II)

(IIa)

wherein $R^1$ to $R^5$, $R^{1'}$ to $R^{5'}$, $L^1$, $L^2$, p, q, and n are as defined above.

In the method according to the present invention, a polybenzimidazole is finally produced. This polybenzimidazole may have a wide range of intrinsic viscosities depending upon the structure, molecular weight and the like. In the present invention, however, the molecular weight of the polybenzimidazole is generally 2,000 to 1,000,000, preferably 2,000 to 300,000, more preferably 5,000 to 100,000. Preferably, the polybenzimidazole used in the present invention has an intrinsic viscosity of not less than 0.2.

Specific examples of such polybenzimidazoles include:
poly-2,2'-(m-phenylene)-5,5'-dibenzimidazole (formula (II));
poly-2,2'-(diphenylene-2",2''')-5,5'-dibenzimidazole;
poly-2,2'-(diphenylene-4",4''')-5,5'-dibenzimidazole;
poly-2,2'-(1",1",3"-trimethylindanylene)-3",5"-p-phenylene-5,5'-dibenzimidazole;
2,2'-(m-phenylene)-5,5'-dibenzimidazole/2,2'-(1",1",3"-trimethylindanylene)-3",5"-p-p henylene-5,5'-dibenzimidazole copolymer;
2,2'-(m-phenylene)-5,5'-dibenzimidazole/2,2'-(diphenylene-2",2''')-5,5'-dibenzimidazole copolymer;
poly-2,2'-(furylene-2",5")-5,5'-dibenzimidazole;
poly-2,2'-(naphthalene-1",6")-5,5'-dibenzimidazole;
poly-2,2'-(naphthalene-2",6")-5,5'-dibenzimidazole;
poly-2,2'-amylene-5,5'-dibenzimidazole;
poly-2,2'-octamethylene-5,5'-dibenzimidazole;
poly-2,2'-cyclohexenyl-5,5'-dibenzimidazole;
poly-2,2'-(m-phenylene)-5,5'-di(benzimidazole)-ether;
poly-2,2'-(m-phenylene)-5,5'-di(benzimidazole)-sulfide;
poly-2,2'-(m-phenylene)-5,5'-di(benzimidazole)-sulfone;
poly-2,2'-(m-phenylene)-5,5'-di(benzimidazole)-methane;
poly-2,2'-(m-phenylene)-5,5'-di(benzimidazole)-propane-2,2; and
poly-ethylene-1,2,2,2"-(m-phenylene)-5,5'-dibenzimidazole)ethylene-1,2.

Solvent

In the method according to the present invention, the solvent is used for dissolving the polybenzimidazole prepolymer and is preferably one which can dissolve the prepolymer and does not decompose the prepolymer or a polymer produced by the cyclization of the prepolymer. The solvent is preferably a polar solvent from the viewpoint of solubility.

Preferred solvents, particularly polar solvents, are methyl pyrrolidone, dimethylacetamide, dimethylformamide, diethylacetamide, dimethylmethoxyacetamide, dimethyl sulfone, and mixtures thereof.

Prepolymer Solution

The solution comprising a polybenzimidazole prepolymer used in the method according to the present invention is a solution of the above polybenzimidazole dissolved in the above solvent. Two methods may be mentioned for preparing the prepolymer solution: (1) a method wherein the prepolymer is dissolved in the solvent; and (2) a method wherein precursors, i.e., monomers, of a prepolymer, are reacted in a liquid phase and the liquid after the reaction as such is used as the prepolymer solution.

When the prepolymer is dissolved in the solvent, the amount of the prepolymer used is preferably 1 to 50% by weight, more preferably 20 to 30% by weight, from the viewpoints of finally forming a thicker polybenzimidazole coating and maintaining the coatability of the prepolymer solution.

In the case of the method wherein monomers are reacted in a liquid phase to produce a prepolymer solution, the prepolymer may be prepared, for example, by reacting tetraaminodiphenyl corresponding to a monomer unit in the first brackets in formula (I) with a dialdehyde corresponding to a monomer unit in the second brackets in formula (I) in a suitable solvent. For example, a prepolymer, wherein $R^1$ to $R^5$ and $R^{1'}$ to $R^{5'}$ each are hydrogen, $L^1$ is phenyl, and $L^2$ is a single bond, may be prepared by reacting 3,3',4,4'-tetraaminodiphenyl with dialdehydebenzene.

When monomer solutions corresponding to respective monomer units are reacted to produce a prepolymer, a prepolymer solution is obtained after the reaction. If this prepolymer solution as such can be coated onto a substrate, then the process could be simplified. For this reason, a solvent, in which the solubility of the prepolymer is high, is preferably selected as the solvent for the monomers. The above described solvents may be mentioned as specific examples of the solvent for the monomers. Thus, the method wherein the monomers are reacted in a liquid phase, can easily provide a prepolymer solution having an increased concentration and thus is preferred.

When a prepolymer is produced from monomer solutions, the concentration of the monomer solution is preferably regulated so that the concentration of the finally obtained prepolymer solution is suitable. The concentration range of the monomer solution in this case is preferably 10 to 80% by weight. When these monomer solutions are mixed together, a preferred mixing method is to add one of the monomer solutions at a suitable dropping speed to the other monomer solution with stirring. At that time, the reaction is preferably carried out at −40 to 40° C. from the viewpoints of practical temperature and the prevention of the production of impurities by a side reaction. The dropping speed at that time is preferably 0.01 to 10% by weight/min based on the initial weight of the solution to be dropped.

The prepolymer may be produced by any other method. In any case, preferably, the prepolymer is produced by a method which is carried out in the absence of a metal catalyst from the viewpoint of preventing the inclusion of metallic impurities in the prepolymer. Further, regarding the solvent used, preferably, metal impurities are absent, and the metal impurity concentration is low.

The prepolymer solution may contain other additives in addition to the polybenzimidazole prepolymer. Such additives include fillers.

Fillers usable herein include (1) inorganic fillers, specifically glass fibers, metallic fibers, silicon carbide, and the like, and (2) organic fillers, specifically carbon fibers, carbon black, graphite, and resins such as polybenzimidazole resins. The addition of these fillers can often offer advantageous effects, for example, improved strength of the formed polybenzimidazole coating, increased coating thickness, impartation of electrical characteristics, for example, insulating properties, and improved slidability.

Substrate

In the method according to the present invention, the above prepolymer solution is coated on a substrate. In this case, any substrate may be used. Since, however, the prepolymer is cyclized by heating, the substrate should have suitable heat resistance according to the heating temperature. Specific examples of materials for the substrate usable herein include metals, for example, stainless steel, iron, aluminum, and copper, and inorganic materials, for example, glass, ceramics, for example, alumina, sapphire, mullite, and cordierite. These substrates may be surface treated prior to coating. For example, in the case of metallic substrates, the surface thereof may be subjected to anodizing treatment or roughening treatment.

Also in the formation of a polybenzimidazole film, the substrate used may be properly selected from the above substrates.

Method for Coating Formation

In the method according to the present invention, the prepolymer solution is coated onto a substrate, and the coated substrate is heated to form a polybenzimidazole coating.

The prepolymer solution may be coated onto the substrate by any method, and examples thereof include spray coating, dip coating, roll coating, curtain coating.

Prior to heating, if necessary, a part of the solvent may be removed from the wet coating. The removal of the solvent may be carried out by heating the wet coating to a temperature at which a cyclization reaction and a side reaction do not take place or are less likely to take place, or by applying reduced pressure. The removal of excessive solvent in this way prior to the heating can suppress the occurrence of air bubbles or the like at the time of heating and can reduce defects in the finally cured coating.

Thereafter, the coating is heated to cyclize the prepolymer. The heating may be carried out by any method. In general, however, the heating is carried out using a heating oven, a hot plate, infrared irradiation or the like. Preferably, the temperature is gradually raised. Specifically, the temperature rise rate is preferably 1 to 20° C./min, more preferably 1 to 5° C./min. The ultimate temperature is generally 300 to 400° C. If necessary, after the temperature reaches the ultimate temperature, heating may be continued at a given temperature.

If necessary, coating and heating may be repeated to form a thicker coating.

Method for Film Formation

A polybenzimidazole film may be formed by forming a cured coating on the surface of a substrate according to the above-described method for coating formation and then separating the cured coating from the substrate. The separation of the cured coating may be carried out by any method. In general, however, mechanical separation is used. In this connection, it should be noted that, in order to facilitate the separation of the cured coating from the substrate, the surface of the substrate may be subjected to easy-separation treatment before the polybenzimidazole prepolymer solution is coated onto the substrate. Examples of the easy-separation treatment usable herein include planishing of the surface of the substrate and coating of a remover onto the surface of the substrate.

EXAMPLE

Example

A solution of 2.68 g of dialdehydebenzene in 40 g of dimethylacetamide was added dropwise to a solution of 4.28 g of 3,3',4,4'-tetraaminodiphenyl in 60 g of dimethylacetamide with stirring at 0° C. at a dropping rate of 0.1% by weight/min to produce a prepolymer. The resultant viscous liquid was coated by dipping onto an anodized stainless steel substrate. The temperature of the coated substrate was raised from room temperature to 380° C. over a period of 3 hr for baking. As a result, a 20 μm-thick polybenzimidazole coating could be formed. Further, a 200 μm-thick polybenzimidazole coating could be finally formed by repeating the above procedure.

What is claimed is:

1. A method for forming a polybenzimidazole coating, comprising the steps of: coating a solution containing from 1 to 50% by weight of a polybenzimidazole prepolymer onto a surface of a substrate; and heating the coated substrate to cyclize the prepolymer and thus to form a cured coating on the surface of the substrate.

2. The method according to claim 1, wherein the polybenzimidazole prepolymer is represented by formula (Ia)

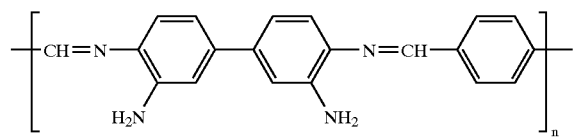

wherein n is a number which represents the degree of polymerization.

3. The method according to claim 1, wherein the solution comprises a polar solvent as a solvent.

4. The method according to claim 3, wherein the solvent is selected from the group consisting of methyl pyrrolidone, dimethylacetamide, dimethylformamide, diethylacetamide, dimethylmethoxyacetamide, dimethyl sulfone, and mixtures thereof.

5. The method according to claim 1, wherein the polybenzimidazole prepolymer is synthesized in the absence of a metal catalyst.

6. The method according to claim 1 wherein the solution comprises a filler.

7. The method according to claim 1, wherein the heating is carried out so that the temperature is raised to 300 to 400° C. at a temperature rise rate of 1 to 20° C./min.

8. An article with a coating formed thereon by the method according to claim 1.

9. A method for film formation, comprising the steps of: coating a solution containing a polybenzimidazole prepolymer onto a surface of a substrate; heating the coated substrate to cyclize the prepolymer and thus to form a cured coating on the surface of the substrate; and separating the cured coating from the substrate.

* * * * *